United States Patent Office 2,801,530
Patented Aug. 6, 1957

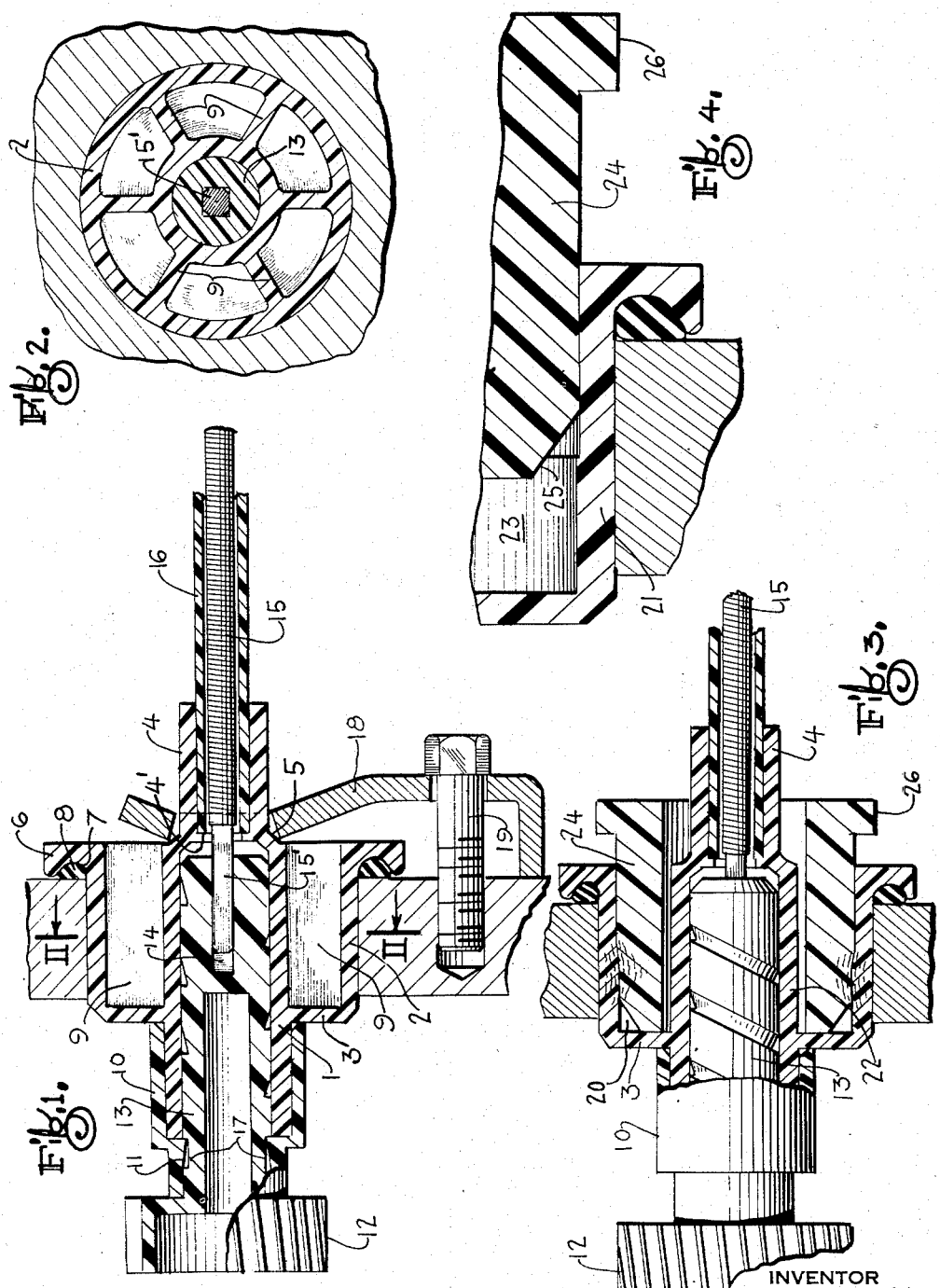

2,801,530

SPEEDOMETER CABLE END HOUSING AND GEAR ASSEMBLY

John E. Holt, Hampton, Conn., assignor, by mesne assignments, to The Danielson Manufacturing Company, Danielson, Conn., a corporation of Rhode Island Application June 6, 1956, Serial No. 589,779

9 Claims. (Cl. 64—3)

This invention relates to a speedometer cable end housing and gear assembly, having reference particularly to the housing which is designed to be mounted in an opening in the transmission casing (gear box) of a motor vehicle.

An object of the invention is to provide a housing and gear element of plastic material (and nylon in particular) in a form such that they can be made economically, installed easily and rigidly, yet be readily removable without damage for inspection or repair.

A further object is to provide a housing and gear element which are light and contain a minimum of material, but are so constructed as to be more strong and durable than other comparable devices, whether of the same or other materials.

Another object is to provide certain improvements in the form, construction and arrangement of the several parts whereby the above-named and other objects may effectively be attained.

Practical embodiments of the invention are shown in the accompanying drawings, in which—

Fig. 1 represents an axial section through a cable housing and gear assembly, mounted in the transmission casing;

Fig. 2 represents a transverse section, taken on the line II—II of Fig. 1;

Fig. 3 represents an axial section through a modified form of cable housing and gear assembly, mounted in the transmission casing, and Fig. 4 represents a detail partial axial section of the housing shown in Fig. 3, on an enlarged scale and showing the parts in an intermediate stage of the assembly operation.

The housing and gear assembly shown herein are intended to constitute the transmission end terminal of a speedometer cable; the instrument end terminal and the intermediate elongated sheathed shaft of the cable may be made substantially as shown and described in copending application Serial No. 570,472 filed March 9, 1956.

Referring to the drawings, and particularly to Figs. 1 and 2 thereof, the housing element comprises a tubular gear-stem-receiving portion 1, a larger coaxial cylindrical wall portion 2, shown as having about half the length of the tubular portion, an annular wall 3 extending in a plane perpendicular to the axis of the portion 1 from the inner end of the portion 2 to the tubular portion, to which it is connected along a zone intermediate the ends thereof, and an outer tubular portion 4, shown as having internal and external diameters smaller than the corresponding dimensions of the tubular portion 1, the said tubular portions being connected by the slightly beveled annular web 5. At the outer (free) end of the cylindrical wall 2 there is formed a laterally extending flange 6, which is undercut to provide a groove 7 adapted to accommodate the O-ring 8 or some equivalent packing material.

The wall 2 is connected to the tube 1 not only by the wall 3 but also by a suitable number (6 being shown) of radially disposed bracing partitions 9 which give the structure strength and rigidity while permitting a substantial saving in material.

A sleeve 10, having a slightly beveled shoulder 11 of reduced diameter, fits on and is preferably cemented to the inwardly projecting end of the tubular portion 1; it being noted that the shoulder 11 has a minimum diameter somewhat smaller than the diameter of the bore of the portion 1.

The take-off gear element comprises the gear 12 itself (normally a worm gear designed to be driven by a worm suitably mounted in the transmission) and an elongated integral stem 13 of a size adapting it to have a free running fit within the bore of the tubular portion 1. The gear and adjacent part of the stem are shown as being hollow, for lightness and saving of material. The end of the stem farthest from the gear is provided with a non-circular (e. g., square) bore 14 adapted to receive the correspondingly shaped end 15' of the flexible drive shaft 15. Said shaft is preferably contained within a tubular sheath 16 of nylon, the end of which fits snugly within the outer tubular portion 4 of the housing and abuts against the annular shoulder 4' provided therein; the sheath may be cemented in place.

An additional feature of the gear element is the provision of an annular external groove 17 around the stem near its point of connection to the gear, this groove being so located that, when the stem 13 is forced past the shoulder 11 into the bore of the portion 1, the said shoulder will snap into said groove at a point when the end of the stem has not quite reached the beveled web 5. The relation between the sleeve 10, shoulder 11, groove 17 and gear 12 is such that the end of the sleeve 10 clears freely the adjacent surface of the gear when the shoulder 11 fits freely in the groove 17, whereby axial movement of the gear element in either direction with respect to the housing is limited to a predetermined small value. The gear stem 13 is provided with a shallow helical oil groove, so disposed that it will tend to feed back toward the interior of the gear box any oil which may have leaked therefrom into the housing, calculated with regard for the normal direction of operation of the cable.

The housing assembly described above is adapted to be mounted, with a tight fit, in a hole formed in the wall of the gear box B, where it may be held firmly by the clamp 18 attached by means of the bolt 19 to the gear box in an obvious manner. The housing should be held in closely enough so that the O-ring 8 (or the like) will supplement the engagement of the wall 2 against the sides of the hole to prevent any leakage of oil from within the gear box.

In the modified form of housing shown in Figs. 3 and 4 the parts are shaped and assembled as described above except that the radially disposed partitions 9 are omitted leaving a deep annular channel 20 between the cylindrical wall portion 21 and the tubular portion 22. Adjacent its inner end the diameter of the channel 20 is reduced, as by the provision of the wide shoulder 23 (Fig. 4). The wall portion 21 is relatively flexible so that such a housing can be inserted easily in the hole formed in the wall of the gear box, as before. Having been thus inserted it is stiffened and locked in position by the forcible application of the annular locking piece 24, the outer diameter of which matches closely the larger diameter of the channel 20. The piece 24 is shown as having a beveled inner edge 25 and an outwardly extending flange 26 around its outer end, the length of the locking piece from its inner end to the under surface of said flange being, preferably, greater than the depth of the channel 20. When the locking piece is driven into the channel its beveled end enables it to wedge its way into the reduced diameter zone of the channel, with deformation both of the wall 21 and of the locking piece, and with the exertion of a very considerable force radially outward against the wall of the hole. This force is quite sufficient to hold the housing in place without need for any clamp and bolt. The locking piece will not work loose but, due to its extra length, it can readily be grasped and pulled out by means of a suitable tool if there is need for removing the housing assembly. The inner diameter of the locking piece is such that it clears, by an appreciable amount, the tubular portion 22 so that the wedge action of the locking piece acts only radially outward and cannot cause the tubular portion to bind on the gear stem.

In each of the assemblies described above the plastic (nylon) gear runs only in contact with the plastic (nylon) housing, thus taking full advantage of the self-lubricating qualities of nylon as well as its great durability.

It will be understood that the structure described herein as a "speedometer cable," and the several parts thereof, can readily be used or adapted for use in the driving of devices other than a speedometer, e. g., a tachometer, a pump, etc., and the description is not to be regarded as restrictive in this respect except as restriction may be clearly implied or required.

Although specific structures embodying the invention have been shown and described, it is obvious that changes in the size, shape and arrangement of the parts, may be made to meet different requirements without departing from the spirit and scope of the invention as defined in the appended claims.

What I claim is:

1. In a flexable cable construction of the character described, a housing and gear assembly of plastic material adapted to be mounted in an opening in a supporting wall, said housing comprising a tubular body portion having an axial bore, a laterally flanged cylindrical wall portion coaxial with said tubular body portion and spaced therefrom, an annular wall extending between said body portion and said cylindrical wall portion, an outer tubular portion coaxial with said body portion and connected to the outer end thereof, and locking means connected to the body portion for limiting axial movement of the gear element, said gear element comprising a gear and an elongated stem integral therewith, the stem having a diameter such that it may freely rotate within the axial bore of the housing body portion and the gear element being provided with means adapted to cooperate with the said locking means.

2. An assembly according to claim 1 in which the locking means is constituted by an inwardly projecting shoulder and in which the means adapted to cooperate therewith is an annular groove formed in the gear stem.

3. An assembly according to claim 2 in which the shoulder is part of a sleeve secured on the inner end of the tubular body portion and in which the groove is near the gear end of the gear stem.

4. An assembly according to claim 3 in which the shoulder is in a position to engage one side of the groove to limit axial movement of the gear element in one direction and in which the sleeve is in a position to engage the gear element to limit axial movement thereof in the opposite direction.

5. An assembly according to claim 1 in which the outer tubular portion is adapted to receive, and be secured to, an end of a flexible cable sheath, said tubular portion being provided with an internal shoulder adapted to act as a stop for the end of said sheath.

6. An assembly according to claim 1 in which the space between the body portion and the cylindrical wall portion is traversed by a plurality of radially disposed bracing partitions.

7. An assembly according to claim 1 in which the space between the body portion and the cylindrical wall portion is open to form an annular channel of substantial depth, and which includes a separate annular locking piece having a size such that it may be forced into said channel in pressure contact with the inner surface of said cylindrical wall.

8. An assembly according to claim 7 in which the diameter of said inner surface is reduced adjacent the inner end of said channel.

9. An assembly according to claim 7 in which the locking piece is provided with a laterally projecting flange and in which the depth of said channel is less than the corresponding dimension of the locking piece measured to the nearest surface of said flange.

No references cited.